T. PHILLIPS.
Carriage-Spring.
No. {819, 31,823}
Patented Mar. 26, 1861.
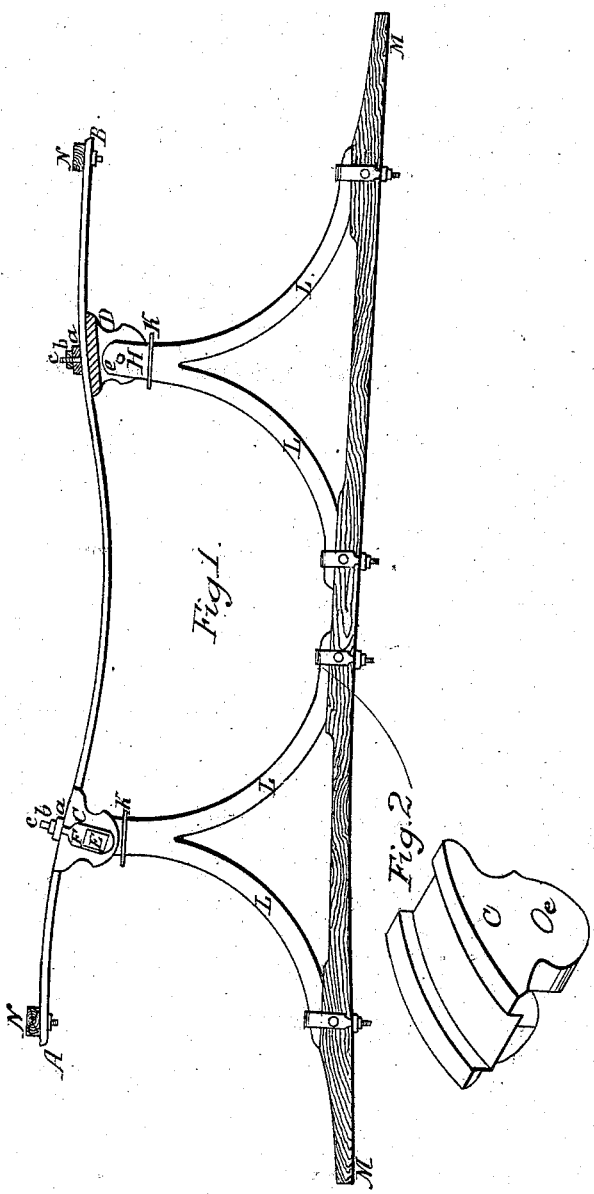

UNITED STATES PATENT OFFICE.

THOMAS PHILLIPS, OF ANN ARBOR, MICHIGAN.

ARRANGEMENT OF CARRIAGE-SPRINGS.

Specification of Letters Patent No. 31,823, dated March 26, 1861.

*To all whom it may concern:*

Be it known that I, THOS. PHILLIPS, of the city of Ann Arbor, in the county of Washtenaw and State of Michigan, have invented a new and Improved Spring for Buggies and other Carriages; and I do hereby declare that the following is a full and exact description thereof, reference being had to the accompanying drawings and to the letters of reference marked thereon.

My invention consists in the use for vehicles, of a compound lever spring, rollers or blocks to which the same is attached, and two double brace standards, fastened to the axletree and serving as points of bearing for the spring the whole being combined and arranged as will be hereinafter more fully set forth.

To enable others skilled in the art to make and use my invention, I will proceed to describe its construction and operation.

Take any common axletree of wood or iron, and attach thereto two upright double brace standards of either cast or wrought iron and of any height chosen. Fasten them at the feet by either bolts or clips. The upper end of the standards are rounded to allow the blocks to roll. Then make two blocks or rollers of cast iron of the form shown in Fig. 2, with a convex upper surface and groove in which to place the spring, which blocks are fastened to the upper ends of the standards by a bolt passing through the clips, the blocks and the standards so as to allow the blocks to roll easily upon them. Then place in the grooves of the two blocks a spring of a single leaf or any required number of leaves of spring steel, of the form represented in Fig. 1 of the diagram by the line A, B, and fasten the same firmly to the blocks by clips, first placing a piece of india rubber packing between the spring and the cross bar of the clip, leaving the ends of the spring projecting from ten to fifteen inches and more or less as deemed necessary, thus forming a compound lever. The bearing is such that by moving the feet of the standards nearer to or farther from the wheel a stiff or limber spring can be obtained. The body of the carriage is fastened in the usual manner to the ends of the spring.

In the accompanying diagram, Fig. 2 represents the blocks or rollers, shown by C in Fig. 1.

In Fig. 1, M, M, is the axle, o o o o the clips attaching the feet of the standards to the axle, L, L, the standards, K a collar, H the rounded head of the standard, E the bolt head and e the bolt passing through the clip, standard, and block, F the clip, C the block or roller, a the cross bar of the clip, b the nut, c the screw, A, B, the compound lever spring and N, N, the points where the body is attached to the spring, scale $\frac{1}{4}$.

The benefits of my invention are, a carriage can be made one eighth lighter and one fifth cheaper than by using the elliptic spring. The main bearing of the standards is near the hub of the wheel, so that the axle need not be so heavy and clumsy in the center as when elliptic springs are used where the bearing is in the center and weakest part, while upon the front axle they are attached to the head block in the same manner as to the hind axle.

The lever spring is of such a nature, that the slightest weight or jar is sufficient to cause it to operate and it operates as well or nearly so, on account of its compound lever nature, with the weight all on one side, as in the center, and when there is a heavy jar the roller takes all the jar from the spring, thereby rendering it less liable to break or give way.

What I claim as my invention and desire to secure by Letters Patent is—

The combination and arrangement of the compound lever spring, the rollers attached to the spring and the two standards as herein described, for the purpose set forth.

THOMAS PHILLIPS.

Witnesses:
F. WURSTER,
ED. P. PITKIN.